Patented Nov. 9, 1926.

1,606,052

UNITED STATES PATENT OFFICE.

HERMANN BOLLMANN, OF HAMBURG, GERMANY, ASSIGNOR, BY MESNE ASSIGNMENTS, TO MARY FULFORD FOSTER, TRUSTEE, OF WASHINGTON, DISTRICT OF COLUMBIA.

PROCESS OF PRODUCING AN ARTICLE OF FOOD.

No Drawing. Application filed May 28, 1925, Serial No. 33,560, and in Germany March 30, 1925.

The present invention relates to an improved process of producing an article of food.

In extracting oil-fruits, especially soybeans, by means of a mixture of alcohol and benzol, besides the oil and the bitter matters also lecithine and phosphatides insoluble in alcohol become dissolved by the solvent. After vaporizing the solvent by conveying steam into the same the lecithine and the phosphatides insoluble in alcohol may be separated in a non-decomposed state from the oil and liberated from oil particles carried along therewith as well as from bitter matters still sticking thereto by washing with acetone. The total amount of phosphatides thus obtained and consisting of lecithine and phosphatides insoluble in alcohol, constitutes a wax-like tough mass.

I have now found that in using or employing the totality of the said phosphatides a preparation may be obtained valuable for human nutrition as well as for food for cattle.

By thoroughly mixing the whole of the phosphatides with lime or chalk a uniform, dry and non-agglomerating powder of agreeable taste will be obtained. On account of its high content of phosphatides and lime or chalk (hereinafter referred to as "calcareous material") this preparation forms a prominent dietetic article of food. When used as an addition to other food materials it serves especially to promote the milk-formation of cows; it may also be employed with great advantage in the fattening of pigs.

The production of the improved article of food may be carried into practice for example in the following manner: One part of the entire wax-like phosphatides is thoroughly mixed with three parts of whiting (cleaned or prepared chalk) and treated in a ball mill until a uniform powder is obtained.

Instead of working up the entire phosphatide material, the lecithine alone may be employed; the whiting may also be replaced by chalk-preparations adapted to be easily resorbed.

I claim:—

1. A food material consisting of a solid powder free from tendency to form lumps containing the phosphatides from oil fruits, containing lectithine mixed with fine calcareous material.

2. An article of food consisting of a pulverulent solid free from tendency to form lumps containing as ingredients the lecithine content of oil fruits mixed with fine calcareous material.

3. An article of food consisting of a stable pulverulent solid containing all the phosphatides of oil fruits including lecithine well mixed with a chalk-preparation adapted to be easily resorbed.

4. A process of producing an article of food, which comprises extracting a substantially fat-free lecithine-containing material from oil-fruits, especially soy-beans and intimately mixing the same with a chalk-preparation adapted to be easily resorbed.

In testimony whereof I affix my signature.

HERMANN BOLLMANN.